July 9, 1935.   S. R. DODDS   2,007,367
RAIL JOINT
Filed April 18, 1933
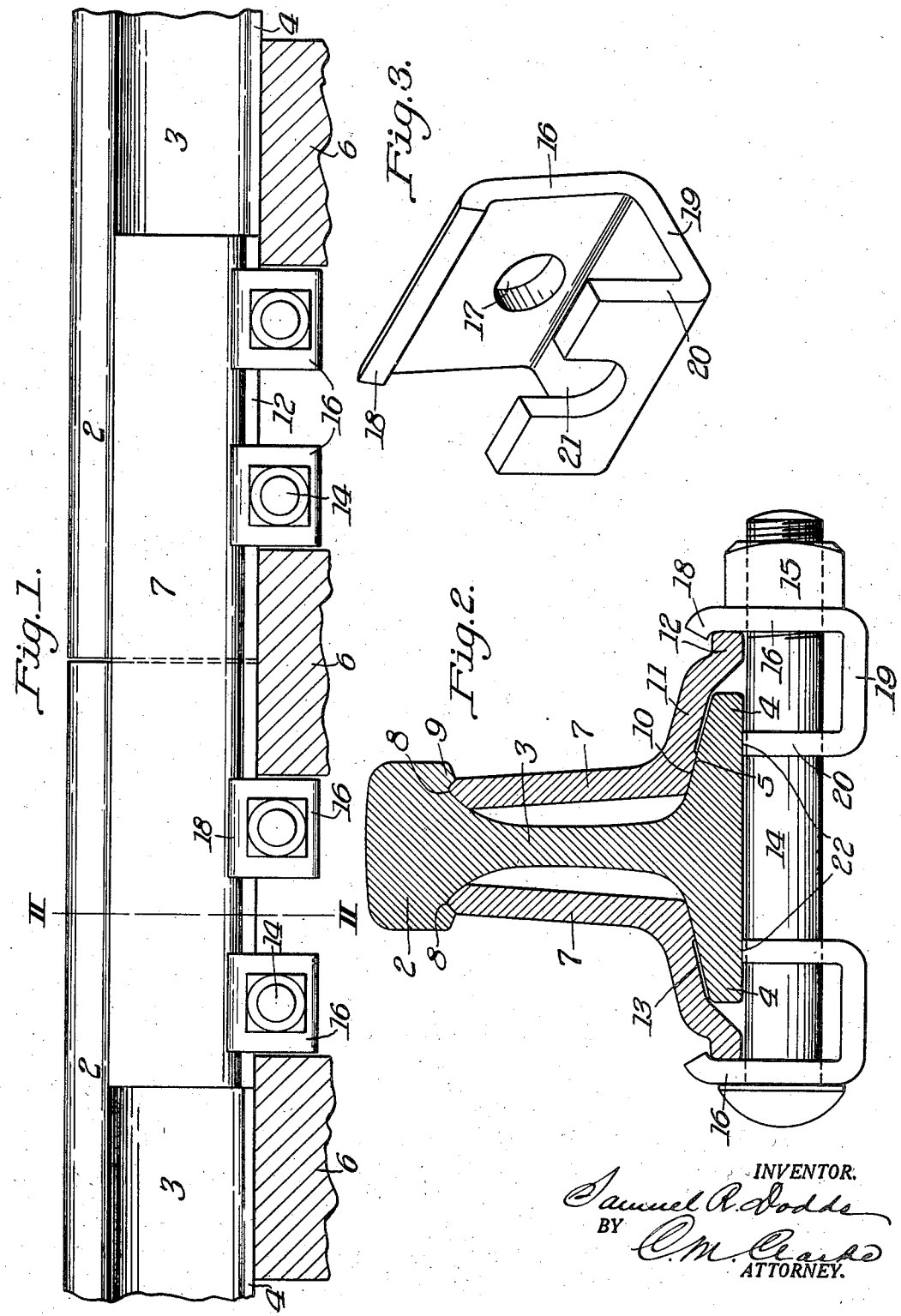
INVENTOR.
Samuel R. Dodds
BY
C. M. Clarke
ATTORNEY.

Patented July 9, 1935

2,007,367

UNITED STATES PATENT OFFICE 2,007,367

RAIL JOINT

Samuel R. Dodds, Pittsburgh, Pa.

Application April 18, 1933, Serial No. 666,699

12 Claims. (Cl. 238—243)

My invention refers to improvements in rail joint construction, adapted to provide means for connecting the ends of rails by means of clamping fish plates or bars and tightening and holding mechanism therefor, without impairing the standard rail plate sections by transverse bolt holes of usual construction.

Generally stated, the improvement consists in connecting the adjacent ends of two rails by means of a pair of fish plates or bars having holding engagement underneath the rail head at opposite sides and in wedging engagement with the upper tapered faces of the rail flanges, and tightening and holding bolts arranged transversely below the rail flanges, effecting inward pressure on the lower terminal edges of the fish plates, by and through a pair of U-shaped resilient brackets.

The invention is illustrated in the accompanying drawing, in which:

Fig. 1 is a view in elevation showing a rail joint embodying my invention;

Fig. 2 is a transverse sectional view on the line II—II of Fig. 1;

Fig. 3 is a perspective view of one of the fish plate engaging clamps.

In the drawing 2—2 are the heads of adjacent rails adapted to be connected, having the usual middle webs 3 and the oppositely extending flanges 4 provided with the upper tapered faces 5. The rails are laid upon the usual ties 6, suitably spaced apart, with their ends resting equally upon a middle tie, or on ties spaced rearwardly of the joint, as preferred.

The fish plates or bars 7 are generally similar to the usual conventional fish plates commonly used with the ordinary transverse connecting bolts, which ordinarily extend through holes in the fish plates and web 3 for clamping the parts together by the usual bolt and nut or nuts. These holes and connecting bolts therethrough are eliminated in the present construction, leaving the rail web and fish plates continuously solid.

The fish plates 7 are arranged at a slight inward inclination as to their upper portions, which terminate and bear underneath the opposite sides of the rail heads in longitudinal sockets or grooves 8 therein, as in Fig. 2. The grooves are just sufficiently deep to ensure positive engagement against outward movement, requiring but a comparatively narrow outer rim portion 9, conforming otherwise to the general outline of a standard rail head of conventional form.

The fish plate 7 is of approximately standard construction, provided with the inner lower contacting shoulder 10 conforming generally to the sloping face 5 of the flange. The plate is then extended outwardly and downwardly as at 11, at the same general inclination of the flange face, terminating in an outer edge 12, on the same general plane as that of the rail flange edges themselves. The lateral extension 11 of the fish plate, as thus made, is preferably slightly spaced above the tapering face of the rail flange, as at 13, for clearance beyond the contacting bearing face 10, avoiding frictional contact when under pressure of the clamping mechanism, beyond the bearing face 10.

As thus constructed and arranged, the oppositely located fish plates are adapted to be forced inwardly by means of the tightening effect of bolts 14 and a nut or nuts 15, and co-operating U-shaped clamps or brackets 16, one at each end portion of the bolt. The outer portion of the clamp 16 is provided with the bolt hole 17 extending therethrough, the clamp projecting upwardly and terminating in an inwardly turned edge portion 18, adapted to make embracing engagement along and over the terminal 12 of the fish plate, as in Fig. 2.

The clamp is provided with an inward lower extension 19 and an inner terminal upwardly extending bearing portion 20, having a clearance opening 21 for the bolt. Such opening is upwardly between its sides, which are adapted to make abutting engagement against the opposite under sides of the rail flange, as at 22, or by the neck of the opening against the bolt 14.

The outer longer leg portion of the clamp 16 is normally inclined inwardly, as indicated in Fig. 3. When the nut 15 is tightened on the bolt, it will exert a degree of resilient pressure, assisting in its holding effect and opposing the resistance of the flange abutting terminals 20, and forcing them upwardly against the under face of the rail flange.

The slight inward deflection of the outer leg of the clamp ensures continuous flat engagement by the nut and opposite bolt head when screwed up tight, as in Fig. 2.

As the tightening effect of the bolt head and nut continues, the lower flanges of the fish plates will be forced inwardly at opposite sides, the faces 10 riding inwardly and upwardly over the upper faces of the flanges, and forcing the upper terminals of the fish plates tightly and effectively against the opposite under sides of the rail head and into snug binding engagement against the outer retaining lips 9.

It will be understood that the lips 9 may be continuous throughout the entire length of the rail, or for only sufficient distance inwardly from its ends to provide for such engagement by the fish plates, as desired, the rail heads in such case remaining of their full cross sectional area intervening such end portions.

As thus constructed and applied, the rail joint is extremely strong and substantial and the application of the clamping mechanism greatly multiplies the applied force of the clamps and their holding bolts.

The construction and operation of the rail joint as above described will be readily understood and appreciated by those familiar with the art. It avoids the necessity of any holes in the fish plates or rails which tend to weaken both, and maintains them, especially the rail, at maximum strength and efficiency throughout its length. There being practically no lateral bending moment perpendicular to the plane of the fish plate members, these may be made lighter, consistent with their required strength.

The construction and application of the rail joint members will save considerable time in laying the track as the joints and their construction is simpler, avoiding the necessity of any such preliminary or extra drilling in manufacture or in the field, especially where it becomes necessary to use a shorter section of rail.

The fish plates and their holding mechanism will of course be proportioned to the size and weight of the rails, while the clamping means are conveniently located immediately beneath the rail flanges, and between adjacent ties, with facility for adjustment longitudinally of the rails within such spaces.

I claim:

1. In a rail joint, the combination with adjacent ends of rails having retaining grooves in their heads, a pair of fish plates embracing both rail ends having upper terminals engaging the grooves, middle bearing portions engaging the rail flanges, oppositely disposed lower edges extending beyond the rail flanges, and a pair of resilient U-shaped clamping brackets having arms engaging the opposite edges of the fish plates and directly against the under side of the rail flanges respectively.

2. In a rail joint, the combination with adjacent ends of rails having retaining grooves in the opposite under sides of the heads, an angle shape fish plate at each opposite side of the rail ends having a middle bearing portion engaging the rail flanges of both rails, an upwardly extending side portion engaging the head grooves of both rails and a laterally extending flange overlapping the rail flanges of both rails, a pair of resilient U-shaped clamps having converging arms directly engaging the edges of the fish plate flanges and the under side of each rail flange respectively, and means holding the clamps in tight engagement therewith.

3. In a rail joint, the combination with two rail ends, of a pair of angle shaped fish plates joining the rail ends and engaging the rail flanges and heads and extending laterally beyond the flanges, a resilient U-shaped clamp at each opposite side having converging arms directly engaging the laterally extending edge portions of each fish plate and the under side of each rail flange respectively, and a lower holding bolt extending through the clamps immediately below the flanges having a tightening nut.

4. In a rail joint, the combination with two rail ends, of a pair of angle shaped fish plates joining the rail ends and engaging the rail flanges and heads and extending laterally beyond the flanges, a series of resilient U-shaped clamps at each opposite side in pairs provided with inner and outer arms having terminals directly engaging the laterally extending portions of the fish plate oppositely beyond the meeting point of the rails and directly against the under side of each rail flange respectively, and lower holding bolts extending through the pairs of clamps each having a terminal head and nut engaging the outer bracket arms of each pair.

5. In a rail joint, the combination with adjacent ends of rails having retaining grooves in their heads, a pair of fish plates embracing both rail ends having upper terminals engaging the grooves, middle bearing portions engaging the rail flanges, oppositely disposed lower edges extending beyond the rail flanges, and a pair of resilient U-shaped clamps each having a straight outer arm engaging the lower edge of the fish plate and a straight inner arm directly engaging the under side of the rail flange, the outer arm converging towards the inner arm, and a holding bolt extending through both clamps below the rail flanges having a head and nut engaging the outer arm of each pair, said fish plates being held in place solely by their engagement with said grooves and said clamps.

6. In combination with adjacent rail ends and a pair of connecting fish plates engaging the sloping rail flange faces and underneath the heads of the rails and having oppositely extending terminal edges projecting beyond the rail flanges, a pair of U-shaped clamping brackets having resilient inwardly inclined outer arms engaging the terminal edges and inner arms engaging underneath directly against the rail flanges, and a holding bolt extending through the brackets below the rail flanges having a head and nut engaging the outer arm of each pair.

7. A rail joint consisting of rail ends and outer fish plates each having a vertically arranged portion in interlocking engagement underneath the heads of adjacent rail ends and a base portion engaging the flanges thereof and laterally extending lower edge portions, and tightening means therefor consisting of pairs of U-shaped brackets each having an outer resilient arm directly engaging said edge portions and an inner resilient arm engaging the under side of the rail flanges respectively, and a holding bolt extending through and connecting the brackets by its head and nut, each engaging the outer resilient arm of each bracket.

8. A clamping bracket for a rail joint as described consisting of a lower wall connecting an inner upwardly extending bracing extension and an outer upwardly extending inwardly inclined resilient clamping extension, the inner extension being bifurcated and the outer extension having a transverse bolt opening.

9. A clamping bracket for a rail joint as described consisting of a lower wall connecting an inner upwardly extending bracing extension and an outer upwardly extending inwardly inclined resilient clamping extension provided with an inwardly disposed terminal edge, each of said extensions having a clearance opening for a holding bolt.

10. A clamping bracket for a rail joint as described consisting of a lower wall connecting an inner upwardly extending bracing extension and an outer upwardly extending straight inwardly sloping resilient clamping extension, each extension having a transverse bolt opening.

11. In a rail joint, the combination with abutting rail ends, of a pair of angle shape fish plates having upper and lower portions engaging underneath the rail head and against the rail flange respectively and provided with laterally extending flanges extending beyond and substantially in the plane of the rail flanges, a pair of resilient U-shaped clamping brackets each having an inner upwardly extending vertical arm engaging underneath the rail flange connected by a horizontal extension with an outer upwardly extending inwardly sloping longer arm having an inwardly turned terminal engaging the laterally extending flange, and a tightening bolt extending through the arms of each clamping bracket having a nut adapted to exert inward bending pressure by the nut and bolt head against both outer flange-engaging arms to effect resilient pressure engagement against the opposite flanges of the fish plates.

12. In a rail joint, the combination with abutting rail ends, of a pair of angle shape fish plates having upper and lower portions engaging underneath the rail head and against the rail flange respectively and provided with laterally extending flanges extending beyond and substantially in the plane of the rail flanges, a pair of resilient U-shaped clamping brackets each having an inner upwardly extending vertical arm engaging underneath the rail flange connected by a horizontal extension with an outer upwardly extending inwardly sloping straight longer arm having an inwardly turned terminal engaging over the laterally extending flange, and a tightening bolt extending through the arms of each clamping bracket having a nut adapted to exert inward bending pressure by the nut and bolt head against both outer flange-engaging arms to effect inward movement and upward pressure of the inner arms and their extensions and resilient pressure engagement by the outer arms against the opposite flanges of the fish plates.

SAMUEL R. DODDS.